United States Patent [19]

Jemison

[11] 3,749,818
[45] July 31, 1973

[54] ELECTRIC CORD STRESS RELIEF COMBINED WITH A STRAIN RELIEF GROMMET

[75] Inventor: William Jemison, Summit, N.J.

[73] Assignee: Heyman Manufacturing Company, Kenilworth, N.J.

[22] Filed: Sept. 30, 1971

[21] Appl. No.: 185,314

[52] U.S. Cl. ................... 174/153 G, 16/2, 248/56
[51] Int. Cl. ...................... F16l 5/00, H01b 17/26
[58] Field of Search .............. 174/65 G, 135, 152 G, 174/153 G; 16/2; 248/56; 339/101, 103 R, 103 B, 103 C, 107

[56] References Cited
UNITED STATES PATENTS

| 3,701,505 | 10/1972 | Klumpp, Jr. ............. 174/153 G X |
| 3,617,615 | 11/1971 | Balzer ........................ 339/107 X |
| 1,210,290 | 12/1916 | Feick ........................ 339/103 R |
| 2,413,927 | 1/1947 | Robertson ..................... 248/56 |
| 2,724,736 | 11/1955 | Klumpp, Jr. ............... 174/153 G |
| 3,122,386 | 2/1964 | Pearson ..................... 174/135 UX |
| 3,493,205 | 2/1970 | Bromberg ................. 174/153 G X |
| 3,516,111 | 6/1970 | Heyman ............................ 16/2 |
| 3,622,942 | 11/1971 | Rynk ............................ 339/107 |

FOREIGN PATENTS OR APPLICATIONS

| 216,606 | 8/1961 | Austria ..................... 174/153 G |
| 1,159,536 | 7/1969 | Great Britain ................ 339/101 |

*Primary Examiner*—Laramie E. Askin
*Attorney*—M. Arthur Auslander et al.

[57] ABSTRACT

A stress relief is integrally joined to a strain relief bushing providing a spaced-away hold to a line cord providing an axis of movement relieving wire stress movement.

21 Claims, 15 Drawing Figures

PATENTED JUL 31 1973 3,749,818

INVENTOR.
WILLIAM JEMISON
BY Avalender + Thomas

ATTORNEYS

INVENTOR.
WILLIAM JEMISON
BY Auslander + Thomas
ATTORNEYS

PATENTED JUL 31 1973 3,749,818

INVENTOR.
WILLIAM JEMISON
BY Auslander + Thomas
ATTORNEYS

ELECTRIC CORD STRESS RELIEF COMBINED WITH A STRAIN RELIEF GROMMET

The present invention relates to a novel stress relief preferably combined with a strain relief bushing.

Common devices for stress relief in the past were springs or other encircling devices seen on items such as electric iron plugs or toaster plugs. Other devices achieved the same result by supporting electric cords by various means along their length or at their stress point or natural bending point.

The need for such stress relief was necessitated by the fact that electric cords or wires which were bent or bendable at a particular point or axis were likely to wear or have their wires cracked by fatigue.

The normal protection afforded a cord by even a usual bushing or strain relief bushing did not change the axis of wire bending, such as at a plug end. Such bending usually resulted in worn or frayed wires in a short period of time.

One of the most successful ways of solving the problem of stress fraying or wear was by using elongated encircling springs. Such springs provided support to a cord and made gentle, if any bend on the cord, and prevented a focus of such bend on a vulnerable point such as the point of exit of a cord from a toaster plug.

It was often found advantageous to combine stress relief with strain relief. Strain relief protected a cord against being pulled at its point of attachment.

As can be seen, devices such as the encircling springs were expensive and required labor to assemble and other devices were among other things, expensive or awkward to use.

According to the present invention, a new stress relief, preferably of a dielectric plastic is provided integral to a bushing or bushing assembly and in a preferred embodiment made in combination with a strain relief bushing.

Although such novel feature or features believed to be characteristic of the invention are pointed out in the claims, the invention and the manner in which it may be carried out may be further understood by reference to the description following and the accompanying drawings.

Referring to the figures in greater detail, where like reference numbers denote like parts in the various figures.

Figure 1:
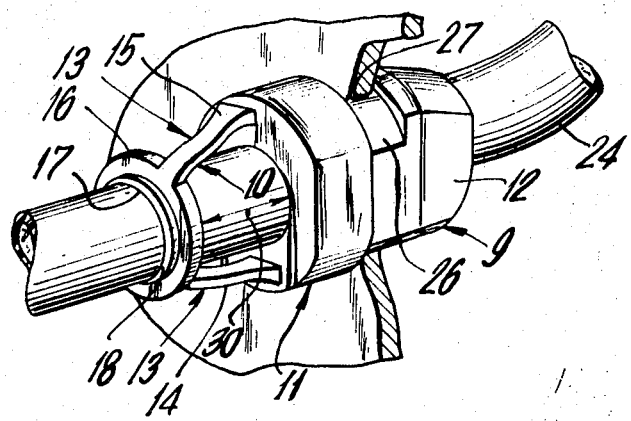
FIG. 1 is a cut-away isometric view of a stress relief and bushing of the present invention in use.
Figure 2:
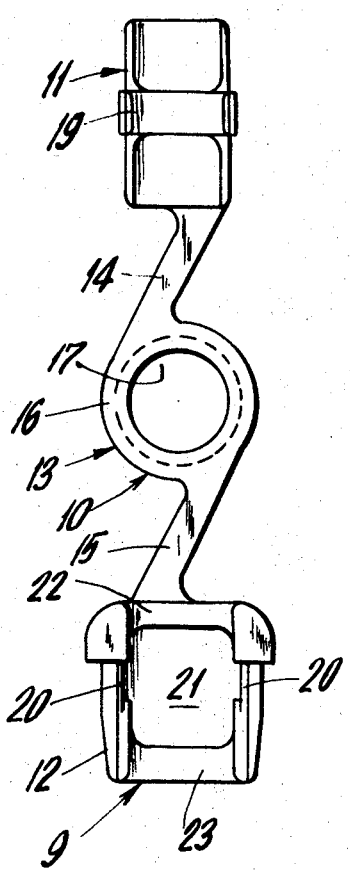
FIG. 2 is a plan view of the stress relief and bushing of FIG. 1.
Figure 3:
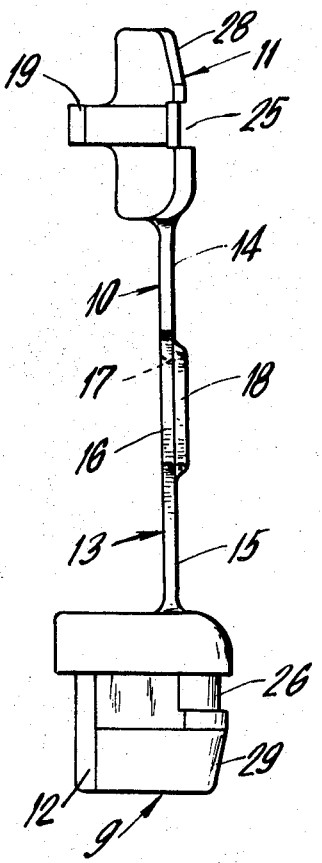
FIG. 3 is a side elevation of the stress relief and bushing of FIG. 1.

The stress relief 10 and strain relief bushing 9 as shown in FIGS. 1 - 3 comprise a strain relief grip block 11, a shank 12, the grip block 11 and shank 12 joined by a webbing 13 which includes the stress relief 10.

The webbing 13 comprises arms 14, 15 or straps which extend to a support ring 16 having an opening 17. The opening 17, as shown in FIGS. 1 - 3 includes an external collar 18.

In the embodiment of the stress relief 10, strain relief bushing 9, as shown in FIGS. 1 - 3, the grip block 11 includes a tongue 19 which fits into a pair of channel tracks 20 which extends into a recess 21 in the shank 12. The tracks 20 extend inward between the lips 22, 23 so that when a cord 24 of proper, selected size is placed lengthwise in the shank 12, the placing of the grip block 11, tongue 19 in the channel tracks 20 will tend to crease the cord 24.

The grip block 11 includes a recess 25 substantially aligned with a recess 26, thus when a cord 24 is engaged in the shank 12 and the grip block 11, tongue 19 is engaged in the channels 20, the placing of the grip block 11 and shank 12 in an aperture 27 causes the tongue 19 to kink the cord 24. The grip block 11 includes a ramp 28. The shank 12 includes a ramp 29.

In use as a stress relief 10, as shown in FIG. 1, an electric cord 24 is positioned in the opening 17 which has a collar 18 extending a selected distance, the cord 24 is then placed in the strain relief bushing 9 and the wire 24, stress relief 10 and bushing 9 are then engaged. When the grip block 11 and shank 12 are inserted into the aperture 27, the grip block 11 and shank 12 are forced together by the ramp 28, 29 until the wall of the aperture 27 is engaged in the recesses 25, 26 holding the bushing 9 in the aperture 27 with the tongue 19 kinking the cord 24. At this point, the bushing 9 is held firmly in the aperture 27. Any strain on the cord 24 is taken by the bushing and the aperture 27 since the tongue 19, grip block 11 and shank 12 all move toward the wall of the aperture 27 containing longitudinal stress at the bushing 9 in the aperture.

With the bushing 9 engaged in the aperture 27, the stress relief 10 provides a flexible grip engirdling the cord 24 spaced away from the face of the grip block 11 and shank 12. This spacing away in effect forms a bending radius 30 the distance between the face of the bushing 9 and the furthest extent of the stress relief 10 so that any bending of the cord 24 engirdled by the stress relief 10 is not at the face of the bushing 9, but extending along a greater distance than a strain relief along would support, that is, the distance from the radius 30 the collar 18.

The angulation of the straps or arms 14, 15 tangent to the support ring 16 of the webbing 13 helps facilitate tortional movement and lateral movement. The support ring 16 is substantially intermediate of the arms 14, 15. The grip block 11, shank 12 and webbing 13 are substantially aligned.

It is preferable to have the stress relief 10 and bushing 9 integrally molded.

Figure 4:
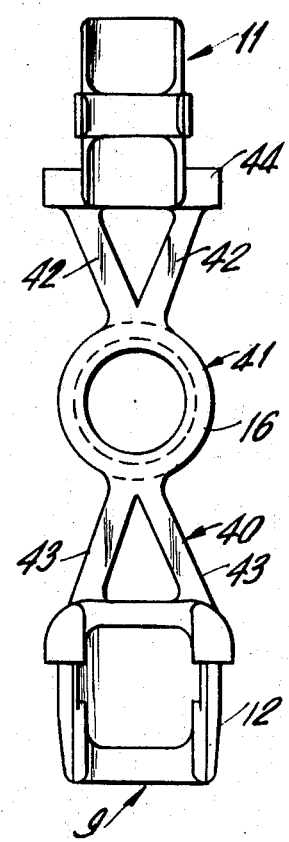
FIG. 4 is a plan view of another embodiment of the stress relief and bushing of the present invention.

The stress relief 40 as shown in FIG. 4 is integral with a grip block 11 and shank 12. The webbing 41 holds the support ring 16 spaced apart from the grip block 11 and shank 12 by two pairs of arms 42, 43 which taper toward the support ring 16. The arms 42 from the grip block 11 extend from an extended yoke 44.

The stress relief 40 and bushing 9 function in use substantially as the stress relief 10 and bushing 9 as disclosed in FIGS. 1 – 3.

Figure 8:
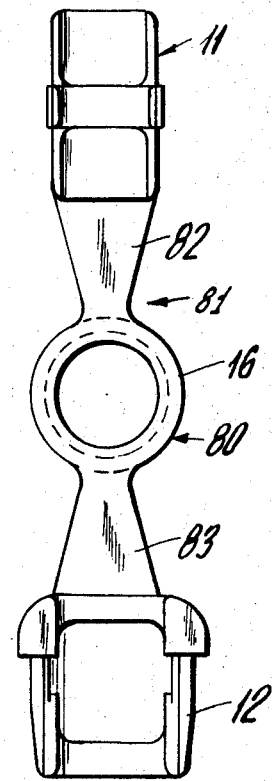
FIG. 8 is a plan view of another stress relief and bushing of the present invention.

The stress relief 80 as shown in FIG. 8 is exemplified with the grip block 11 and shank 12. The webbing 81 of the stress relief 80 comprises a tapered arm 82 from the grip block 11 to the support ring 16 and another tapered arm 83 from the shank 12 to the support ring 16. The tapering of the arms 82, 83, narrowing at the support ring 16, tends to give a spring-like resilience to the stress relief 80. The stress relief 80 with the bushing 9 otherwise functions substantially as described with regard to FIGS. 1 – 3.

Figure 9:
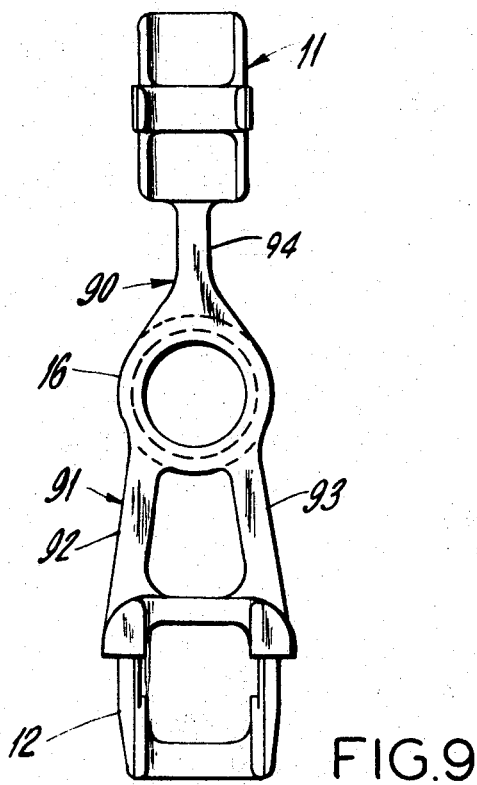
FIG. 9 is a plan view of another stress relief and bushing of the present invention.

The stress relief 90, as shown in FIG. 9 is exemplified with the grip block 11 and shank 12. The webbing 91 comprises arms 92, 93 extending from the shank 12 angling to the support ring 16 and a single arm 94 extending from the center of the grip block 11 to the support ring 16. The stress relief 90 construction provides the flexibility of having arms 92 – 94 to support the support ring 16 from three directions while avoiding a complicated construction extending from the grip block 11.

Figure 5:
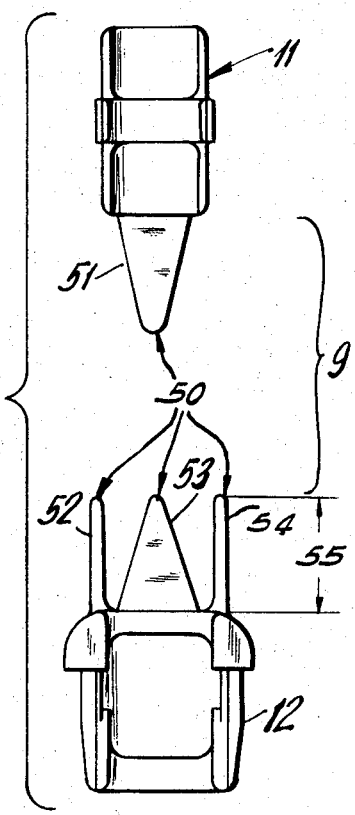
FIG. 5 is an exploded plan view of another stress relief and bushing.

The stress relief 50, as shown in FIG. 5, is exemplified in use with a bushing 9 having a grip block 11 and shank 12. The grip block 11 has a protruding tongue 51. The shank 12 has protruding tongues 52, 53, 54.

The shank 12, tongues 52, 53, 54 protrude from the bottom of the shank 12 face and both sides. When the grip block 11 is engaged, the tongue 51 protrudes forward providing a stress relief surrounding cord 24. As shown, the tongues 51 – 54 are tapered, thus a cord 24 may have some movement beyond the radius 55, the distance between the face of the bushing 9 and the end of the tongues 51 – 54 by movement between the tapered tongues 51 – 54.

Figure 6:
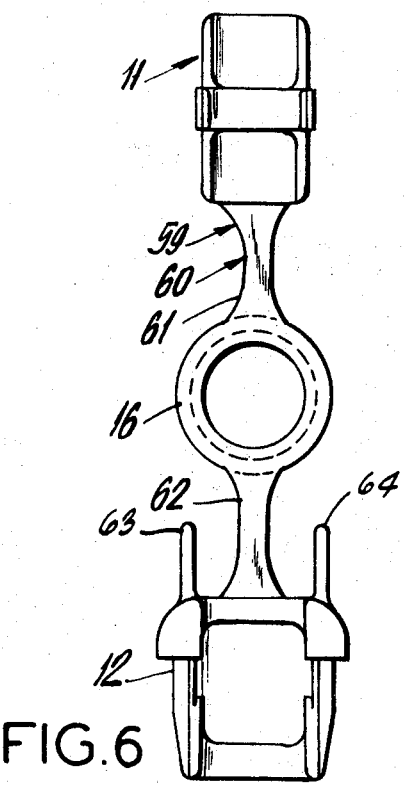
FIG. 6 is a plan view of another embodiment of the stress relief and bushing of the present invention.
Figure 7:
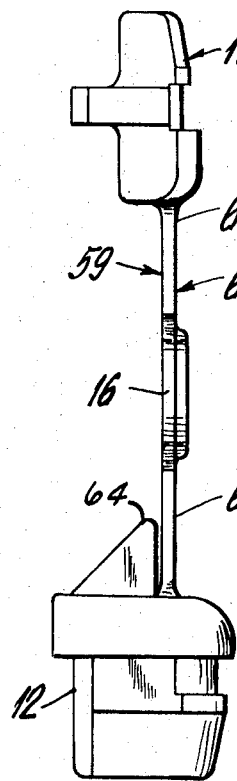
FIG. 7 is a side elevation of the stress relief and bushing of FIG. 6.

The stress relief 60, as shown in FIGS. 6 and 7, has the grip block 11 and shank 12 attached to the arms 61, 62 respectively. The webbing 59 comprising arms 61, 62 supports the ring 16. The face of the shank 12 has a pair of tongues 63, 64 opposite each other and a right angle to the arms 61, 62. Thus, when the stress relief 60 is engaged with a cord 24, stress relief is provided by the compound action of the tongues 63, 64 and the stress relief 60.

Figure 10:
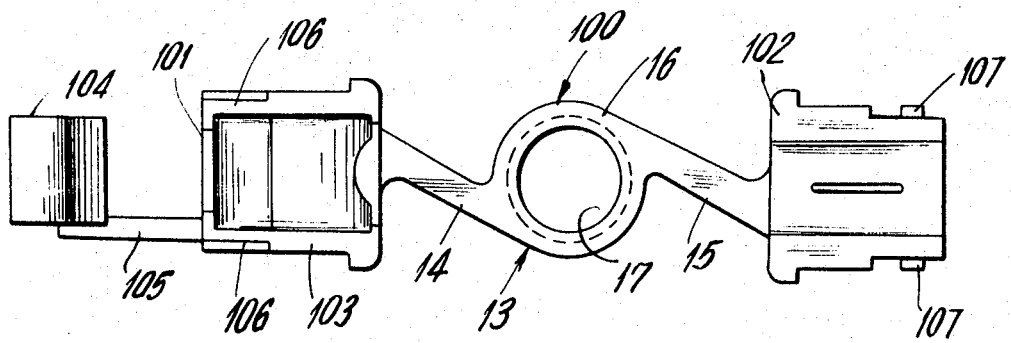
FIG. 10 is a plan view of another stress relief and bushing of the present invention.

The stress relief 100, as shown in FIG. 10 is exemplified by webbing 13 as shown in FIGS. 1 – 3, including arms 14, 15 and a support ring 16. The bushing 101 in this instance is a three-piece bushing 101 having a flat shank section 102, a second shank section 103 and an insertable camming grip block 104. The cord 24 is inserted in the opening 17, then the grip block 104 is folded into the second shank section 103, folded on the strap 105. The bushing 101 is then closed, the ears 106 locking on the detents 107. The stress relief 100 performs its normal function. The cord 24 is given strain relief by the camming action between the camming grip block 104 and the cam surface inside the second shank portion 103.

Figure 12:
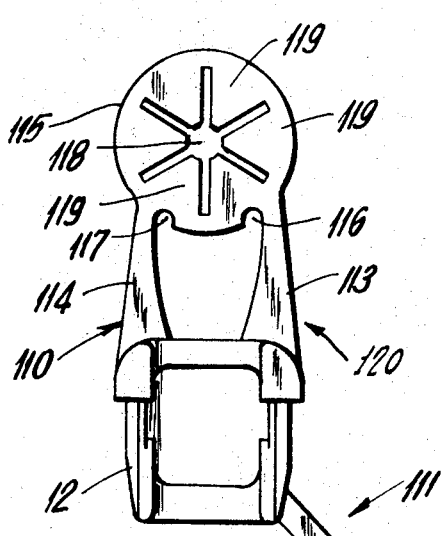
FIG. 12 is a plan view of the embodiment of FIG. 11.
Figure 11:
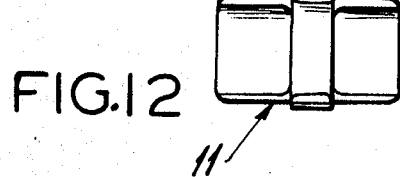
FIG. 11 is a side view of another stress relief and bushing of the present invention engaging an electric cord.

The stress relief 110, as shown in FIGS. 11 and 12, is also combined with a strain relief bushing 111 having a grip block 11 and a shank 12. The grip block 11 and shank 12 are joined by a strap 112. Insofar as a bushing 111 is concerned, its function is substantially the same as the bushing 9 with the grip block 11 and shank 12 interlocking to grasp a cord 24.

The stress relief 110 includes a pair of arms 113, 114, extending outward, and supporting a plate 115. The arms 113, 114 are preferably slightly tapered, the plate 115 preferably includes notches 116, 117 inward of the outer periphery of the plate 115. The plate 115 has a small central opening 118 and is divided into tapering segments 119.

Thus, as can be seen in FIG. 11, a cord 24 passing through the opening 118 will have the segments 119 accommodate themselves to the size of the cord 24 and hold the cord in a spring grasp. The closed bushing 111 is held in an aperture 27 while the arms 113, 114 flex with the plate 115, holding the cord 24 to relieve stress. The webbing 120 as shown in FIGS. 11 and 12, is free and independent of the grip block 11. The notches 116, 117 half form a bending axis for the plate 115.

Figure 13:
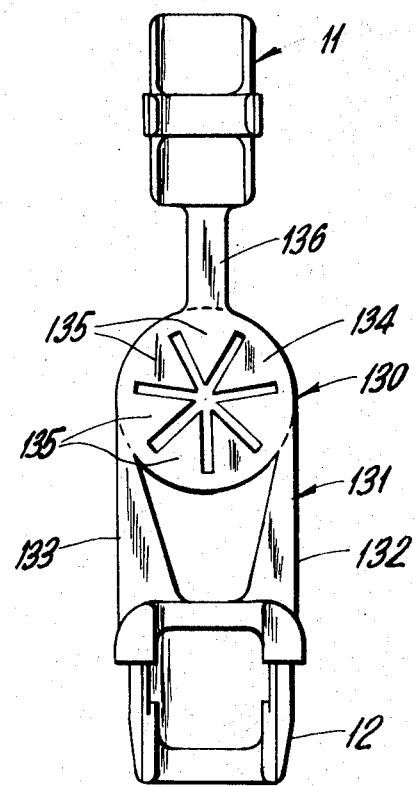
FIG. 13 is another embodiment of the stress relief and bushing of FIG. 11.

In FIG. 13 a stress relief 130 has a webbing 131, comprising a pair of arms 132, 133 extending from a shank 12 and tapering to a point where the arms 132, 133 join a plate 134. The plate 134 has no specially defined opening, but does have segments 135 functionally similar to the segments 119 as shown in FIGS. 11, 12.

A grip block 11 is joined to the other end of the plate 134 by an arm 136. In use, the stress relief 130 provides three support arms 132, 133, 136 holding the plate 134, providing stress relief to the cord 24.

Figure 14:
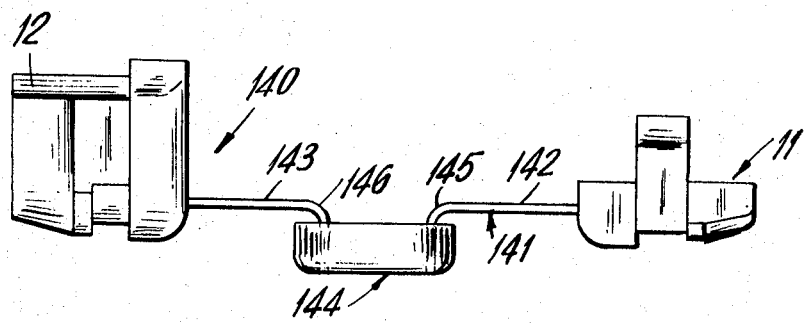
FIG. 14 is a side elevation of another stress relief and bushing of the present invention.

In FIG. 14, the stress relief 140 and bushing 9 have a webbing 141 extending between the grip block 11 and shank 12. The arms 142, 143 meet the support ring 144 from the underside. Thus, the support ring 144 is on a different plane from that of the arms 142, 143.

The curves 145, 146 allow the stress relief 140 to maintain a substantially longitudinal position when not in use.

Figure 15:
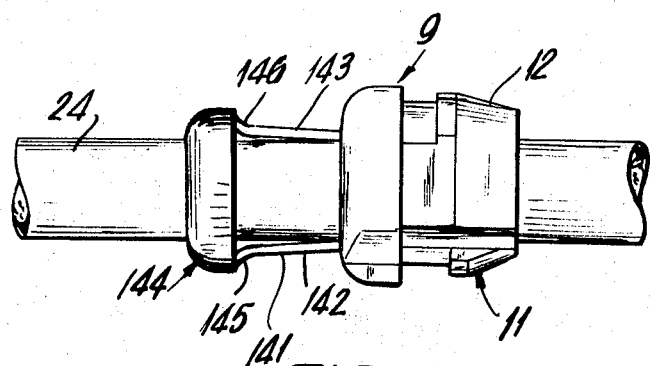
FIG. 15 is the stress relief and bushing of FIG. 14 engaged on a cord.

The curves 145, 146 provide a greater stress relief distance over a shorter longitudinal length of stress relief 140 and bushing 9 since the curves 145, 146 are functional in providing length to the arms 142, 143, when in the shank 12 and grip block 11, as shown in FIG. 15, yet the curves 145, 146 do not further space apart the shank 12 and grip block 11 when they are in a longitudinal position.

The width of the support ring 144 may further extend the distance of stress relief support for the cord 24 from the outer edge of the support ring 144 to the face of the shank 12 and bushing 9.

As shown in FIG. 15, the cord 24 in the support ring 144 and with the shank 12 and grip block 11 closed, tends to get further support. The arms 142, 143 bow inward from the curves 145, 146 and tend to hug the cord 24. This hugging is both supportive and generally more acceptable to a consumer of a toaster plug, for instance, who might not understand the absence of the usual wire spring.

No sizes nor dimensions have been described since the stress reliefs shown in the present application must be selected by those skilled in the art to determine the requisites for the various diameter and shaped cords, the necessary length each cord and type of cord must be held away for a proven radius for stress relief. Also, there is the question of which stress relief is best suited for a particular usage.

The terms and expressions which are employed are used as terms of description; it is recognized, though, that various modifications are possible.

Having thus described certain forms of the invention in some detail, what is claimed is:

1. In combination with a strain relief bushing adapted to hold an electric cord in an aperture, said strain relief bushing including a shank portion and grip block portion, said shank portion and grip block portion interfitting and adapted to kink said cord, integral stress relief means including a webbing; said webbing extending from both said shank and said grip block parts; said webbing including an integral engirdling means substantially intermediate thereof for said electric cord; said engirdling means being open therethrough; said webbing also comprising strap means in the form of arms retaining said engirdling means; said strap means extending a selected distance from said strain relief bushing to said engirdling means; said strap means and said engirdling means when engaged with said electric cord enabling movement for said electric cord substantially spaced apart from said strain relief bushing, said strap means supporting said engirdling means at a position spaced away from said strain relief bushing.

2. The invention of claim 1, wherein said strap means joins said engirdling means at a tangent, and said webbing is adapted for torsional movement when engaged with said electric cord.

3. The invention of claim 1 wherein said strap means are joined inward of the periphery of said engirdling means.

4. The invention of claim 3 wherein said engirdling means extends beyond the width of said strap means.

5. The invention of claim 3 wherein said strap means joins said engirdling means at a curve from said strap means.

6. The invention of claim 1 wherein said strap means extend from the outer periphery of said engirdling means.

7. The invention of claim 1 wherein said strap, means tends to bow inward when said strain relief portions are in closed position.

8. The invention of claim 1 wherein said strap means are substantially parallely aligned.

9. The invention of claim 8 wherein said strap means taper toward said engirdling means.

10. The invention of claim 1 wherein at least one part of said strain relief bushing includes at least one electric cord supporting tongue.

11. The invention of claim 1 including more than two strap means.

12. The invention of claim 11 wherein at least two said strap means converge toward said engirdling means.

13. The invention of claim 12 wherein four said strap means converge toward said engirdling means.

14. The invention of claim 11 including three strap means.

15. The invention of claim 14 wherein said engirdling means comprises a plate including segments.

16. The invention of claim 1 wherein said engirdling means comprises a plate including segments.

17. The invention of claim 1 wherein said strain relief bushing includes more than two parts.

18. In combination with a strain relief bushing adapted to hold an electric cord in an aperture, the said strain relief bushing including a shank portion and grip block portion, said shank portion and grip block portion interfitting and adapted to kink said electric cord, integral stress relief means including a plurality of tongues for surrounding said electric cord, said tongues attached to and extending a selected distance from said strain relief bushing, said tongues being for providing a stress relief for said electric cord.

19. The invention of claim 18 wherein said tongues are substantially evenly spaced about said strain relief bushing.

20. The invention of claim 18 wherein at least two pieces of said strain relief bushing include said tongues.

21. The invention of claim 18 wherein at least one of said tongues is tapered.

* * * * *